(12) United States Patent
Iwaya et al.

(10) Patent No.: US 12,409,517 B2
(45) Date of Patent: Sep. 9, 2025

(54) ULTRASONIC WELDING APPARATUS, ASSEMBLING SYSTEM, AND ASSEMBLING METHOD

(71) Applicant: TOYOTA JIDOSHA KABUSHIKI KAISHA, Toyota (JP)

(72) Inventors: Takahiro Iwaya, Toyota (JP); Yasunao Tsujimura, Okazaki (JP); Yuusuke Nakagawa, Toyota (JP); Kimihiro Yano, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/589,624

(22) Filed: Feb. 28, 2024

(65) Prior Publication Data

US 2024/0359271 A1    Oct. 31, 2024

(30) Foreign Application Priority Data

Apr. 25, 2023  (JP) .................................. 2023-071273

(51) Int. Cl.
| | |
|---|---|
| *B23K 37/00* | (2025.01) |
| *B23K 20/10* | (2006.01) |
| *B23K 37/02* | (2006.01) |
| *B23K 37/04* | (2006.01) |
| *B23K 101/00* | (2006.01) |

(52) U.S. Cl.
CPC .............. *B23K 37/02* (2013.01); *B23K 20/10* (2013.01); *B23K 37/0426* (2013.01); *B23K 2101/006* (2018.08)

(58) Field of Classification Search
CPC .............. B23K 20/10; B23K 2101/006; B23K 37/047; B23K 20/123; B23K 20/1245; B23K 20/126; B23K 37/0443; B23K 20/002
See application file for complete search history.

(56) References Cited

U.S. PATENT DOCUMENTS

| | | | | |
|---|---|---|---|---|
| 5,409,158 | A * | 4/1995 | Angel | B62D 65/02 29/430 |
| 7,854,361 | B2 * | 12/2010 | Gauggel | B23K 37/04 228/49.1 |
| 9,050,688 | B2 * | 6/2015 | Yamaguchi | B23K 20/125 |
| 9,248,522 | B2 * | 2/2016 | Saitou | B23K 20/126 |
| 11,034,024 | B2 * | 6/2021 | Saez | B25J 9/1682 |
| 11,603,150 | B2 * | 3/2023 | Chami | B25J 9/1687 |

(Continued)

FOREIGN PATENT DOCUMENTS

JP         2016-10883 A     1/2016

*Primary Examiner* — Erin B Saad
(74) *Attorney, Agent, or Firm* — Oblon, McClelland, Maier &Neustadt, L.L.P.

(57) ABSTRACT

It is possible to weld first and second members at various angles and allow melted members to flow onto a welding surface without dripping downward. An ultrasonic welding apparatus includes: a first robot including a holding part configured to hold a first member rotatably and tiltably and a moving part configured to move the robot itself; and a welding main body in which a second member is disposed on the first member held by the holding part of the first robot and which perform welding by vibrating the first and second members by an ultrasonic horn.

3 Claims, 6 Drawing Sheets

(56) References Cited

U.S. PATENT DOCUMENTS

| | | | |
|---|---|---|---|
| 2015/0336271 A1* | 11/2015 | Spicer | B25J 9/1687 |
| | | | 228/9 |
| 2017/0334016 A1* | 11/2017 | Rinker | B23K 20/227 |
| 2018/0141279 A1* | 5/2018 | Rousseau | B29C 66/8221 |
| 2020/0189024 A1* | 6/2020 | Yamane | B23K 20/106 |
| 2021/0308870 A1* | 10/2021 | Benson | G05B 19/418 |

* cited by examiner

ULTRASONIC WELDING APPARATUS, ASSEMBLING SYSTEM, AND ASSEMBLING METHOD

CROSS REFERENCE TO RELATED APPLICATIONS

This application is based upon and claims the benefit of priority from Japanese patent application No. 2023-071273, filed on Apr. 25, 2023, the disclosure of which is incorporated herein in its entirety by reference.

BACKGROUND

The present disclosure relates to an ultrasonic welding apparatus, an assembling system, and an assembling method for performing ultrasonic welding.

Ultrasonic welding apparatuses which perform welding by vibrating first and second members with an ultrasonic horn have been known (see, for example, Japanese Unexamined Patent Application Publication No. 2016-010883).

SUMMARY

However, in the ultrasonic welding apparatus described above, for example, when first and second members are welded at various angles, a complicated dedicated machine may be required. In addition, when the ultrasonic horn is pressed against side surfaces of the first and second members and is vibrated, it is possible that melted members may drip downward.

The present disclosure has been made to solve such problems, and one of main objects of the present disclosure is to provide an ultrasonic welding apparatus, an assembling system, and an assembling method that can weld first and second members at various angles and allow melted members to flow onto a welding surface without dripping downward.

One aspect of the present disclosure to achieve the aforementioned object is an ultrasonic welding apparatus including: a first robot including a holding part configured to hold a first member rotatably and tiltably and a moving part configured to move the robot itself; and a welding main body in which a second member is disposed on the first member held by the holding part of the first robot and which perform welding by vibrating the first and second members by an ultrasonic horn.

One aspect of the present disclosure to achieve the aforementioned object is an assembling system including the aforementioned ultrasonic welding apparatus, in which the holding part of the first robot holds a welded part of the first member in a horizontal state and the moving part moves in such a way that the welded part is located directly below the ultrasonic horn of the welding main body, a second robot holds the second member and disposes the second member onto the welded part of the first member, and the welding main body presses the ultrasonic horn against the first and second members held by the first and second robots, respectively, thereby performing welding.

In this aspect, at least one of an assembling device for assembling, a bolting device for bolting, and an inspection device for inspecting the first and second members may be disposed as a device used in a process that comes after the welding, and when work in each process is completed, the first robot may carry a member on which work in each process has been completed to a device used in a next process and dispose the member in the device, and this device may perform work on the disposed member.

One aspect the present disclosure to achieve the aforementioned object is an assembling method using the aforementioned ultrasonic welding device, the holding part of the first robot holds a welded part of the first member in a horizontal state and the moving part moves in such a way that the welded part is located directly below the ultrasonic horn of the welding main body, a second robot holds the second member and disposes the second member onto the welded part of the first member, and the welding main body presses the ultrasonic horn against the first and second members held by the first and second robots, respectively, thereby performing welding.

According to the present disclosure, the main object of the present disclosure is to provide an ultrasonic welding apparatus, an assembling system, and an assembling method capable of welding first and second members at various angles and allowing melted members to flow onto a welding surface without dripping downward.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Hereinafter, this embodiment will be described with reference to the drawings. An assembling system according to this embodiment has an ultrasonic welding apparatus which assembles first and second members by ultrasonic welding. The first and second members are resin members such as bumpers or retainers of vehicles, for example.

Figure 1:
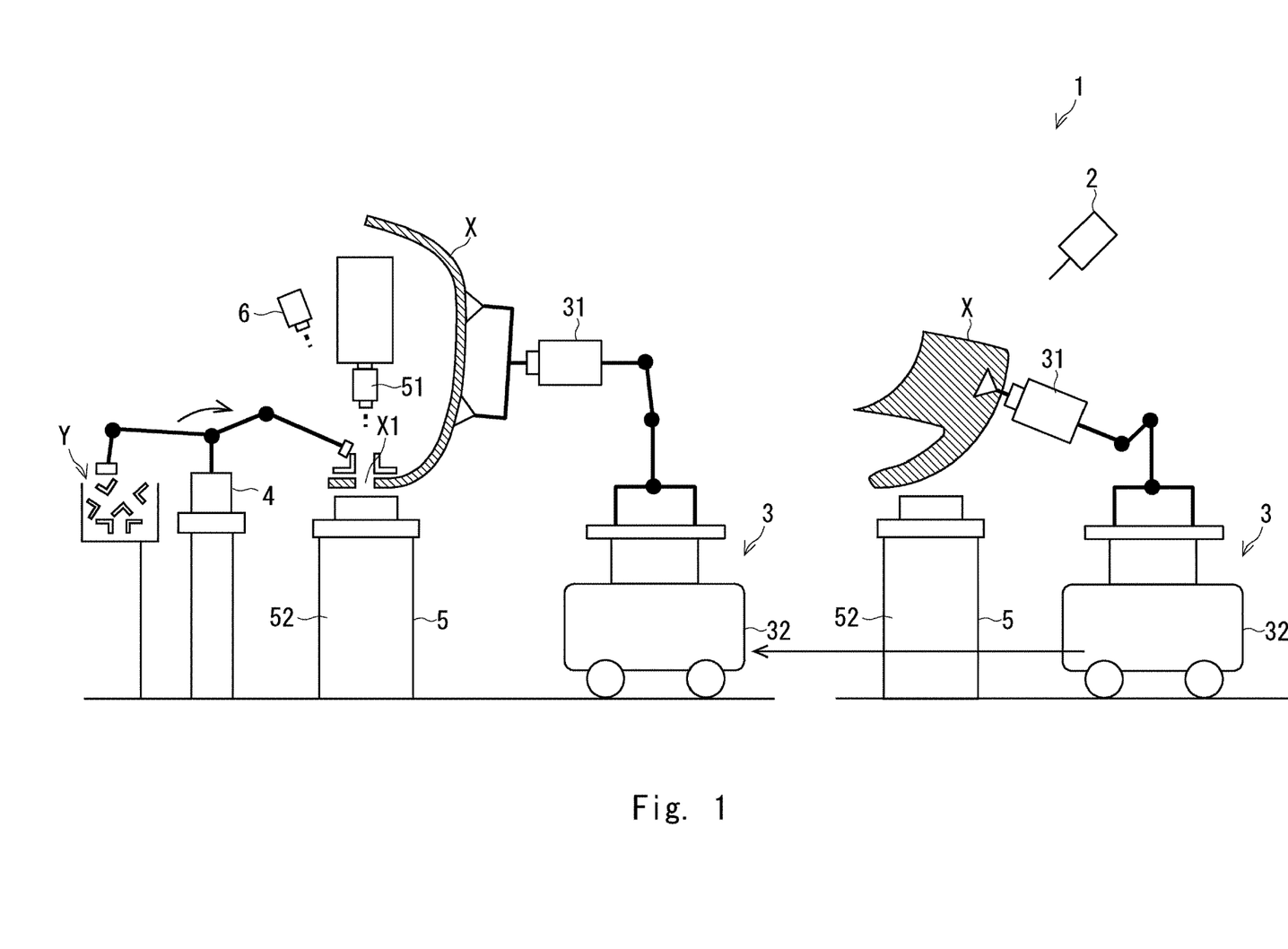
FIG. 1 is a schematic diagram showing a schematic configuration of an ultrasonic welding apparatus according to this embodiment.

FIG. 1 is a schematic diagram showing a schematic configuration of an ultrasonic welding apparatus according to this embodiment. An ultrasonic welding apparatus 1 according to this embodiment includes a first sensor 2, a first robot 3, a second robot 4, a welding main body 5, and a second sensor 6.

The first robot 3 has a holding part 31 for holding a first member X rotatably and tiltably, and a moving part 32 for moving the robot itself. The holding part 31 is configured, for example, as an articulated arm, and includes an end effector capable of holding the first member X at its tip.

The end effector holds the first member X by, for example, sucking or gripping. As shown in FIG. 1, for example, the holding part 31 sucks and holds the bumper. The moving part 32 is configured as a moving carriage capable of moving to a desired position by, for example, driving a wheel by a motor.

For example, a worker disposes the first member X in a predetermined position such as a working table. The holding part 31 holds the first member X disposed in the predetermined position. The first sensor 2 is, for example, a camera capable of capturing an image of the first member X disposed in the predetermined position. The holding part 31 holds the first member X while correcting its position based on the image of the first member X acquired by the first sensor 2.

The moving part 32 moves to the vicinity of the welding main body 5 while the holding part 31 keeps holding the first member X. The holding part 31 disposes the first member X that it holds in the welding main body 5.

At this time, the holding part 31 holds the welded part X1 of the first member X in a horizontal state, and the moving part 32 moves in such a way that the welded part X1 is located directly under the ultrasonic horn 51 of the welding main body 5. The second sensor 6 is, for example, a camera capable of capturing an image of a part directly under the ultrasonic horn 51.

Figure 2:
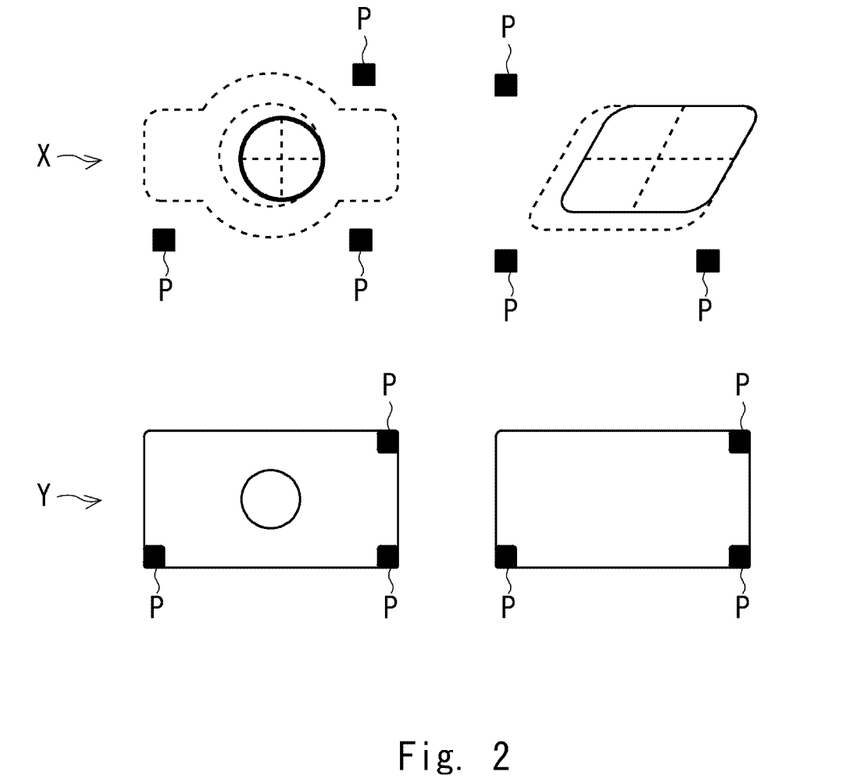
FIG. 2 is a diagram showing reference markings in first and second members.

The moving part 32 moves based on the image of the first member X captured by the second sensor 6 in such a way that the welded part X1 is positioned directly under the ultrasonic horn 51 of the welding main body 5. As shown in FIG. 2, the first member X may be provided with reference markings P for positioning. Accordingly, the position of the first member X can be easily grasped, thereby shortening the positioning time and reducing man-hours.

As shown in FIG. 1, the second robot 4 holds the second member Y and disposes the second member Y onto the welded part X1 of the first member X. The second robot 4 is configured, for example, as an articulated arm, and includes an end effector capable of holding the second member Y provided at its tip. The root of the second robot 4 is fixed to a fixing table or the like.

For example, the second robot 4 takes out, one by one, one of a plurality of second members Y arranged adjacent to each other, and disposes the second member Y that has been taken out onto the welded part X1 of the first member X. Based on the images of the first and second members X and Y captured by the second sensor 6, the second robot 4 disposes the second member Y on the welded part X1 of the first member X while correcting its position.

As shown in FIG. 2, the second member Y may be provided with reference markings for positioning. As a result, the position of the second member Y can be easily grasped, thereby shortening the positioning time and reducing man-hours.

For example, as shown in FIG. 1, the second robot 4 holds a retainer and disposes it on the welded part X1 of the horizontal bumper disposed on the welding main body 5.

The welding main body 5 has a welding table 52 for disposing the first and second members X and Y, and an ultrasonic horn 51 for applying ultrasonic vibration to the first and second members X and Y. The welding main body 5 presses the ultrasonic horn 51 to the welded part X1 of the first and second members X and Y provided on the welding table 52 in the vertical direction and applying vibration thereto, thereby performing ultrasonic welding to melt and adhere the members.

The first robot 3, the second robot 4, and the welding main body 5 repeat the aforementioned ultrasonic welding by changing the welded part X1 of the first member X. When the welding process is completed, the first robot 3 carries the welded first and second members X and Y to the device used in the next process.

In a conventional ultrasonic welding apparatus, for example, when first and second members are welded at various angles, a complicated dedicated machine may be required. In addition, when the ultrasonic horn is pressed against the side surfaces of the first and second members to give vibration, melted members may drip downward.

On the other hand, in the ultrasonic welding apparatus 1 according to this embodiment, as described above, the holding part 31 of the first robot 3 holds the first member X rotatably and tiltably, and the moving part 32 moves the robot itself.

Thus, the first and second members X and Y can be welded at various angles. The holding part 31 can hold the welded part X1 of the first member X in a horizontal state, and the moving part 32 can be moved in such a way that the welded part X1 is located directly under the ultrasonic horn 51 of the welding main body 5. The second member Y is disposed on the first member X held by the holding part 31, and the first and second members X and Y are vibrated by the ultrasonic horn 51, so that the welding main body 5 performs welding. Thus, the melted members can be poured onto the welding surface without dripping downward.

Figure 3:
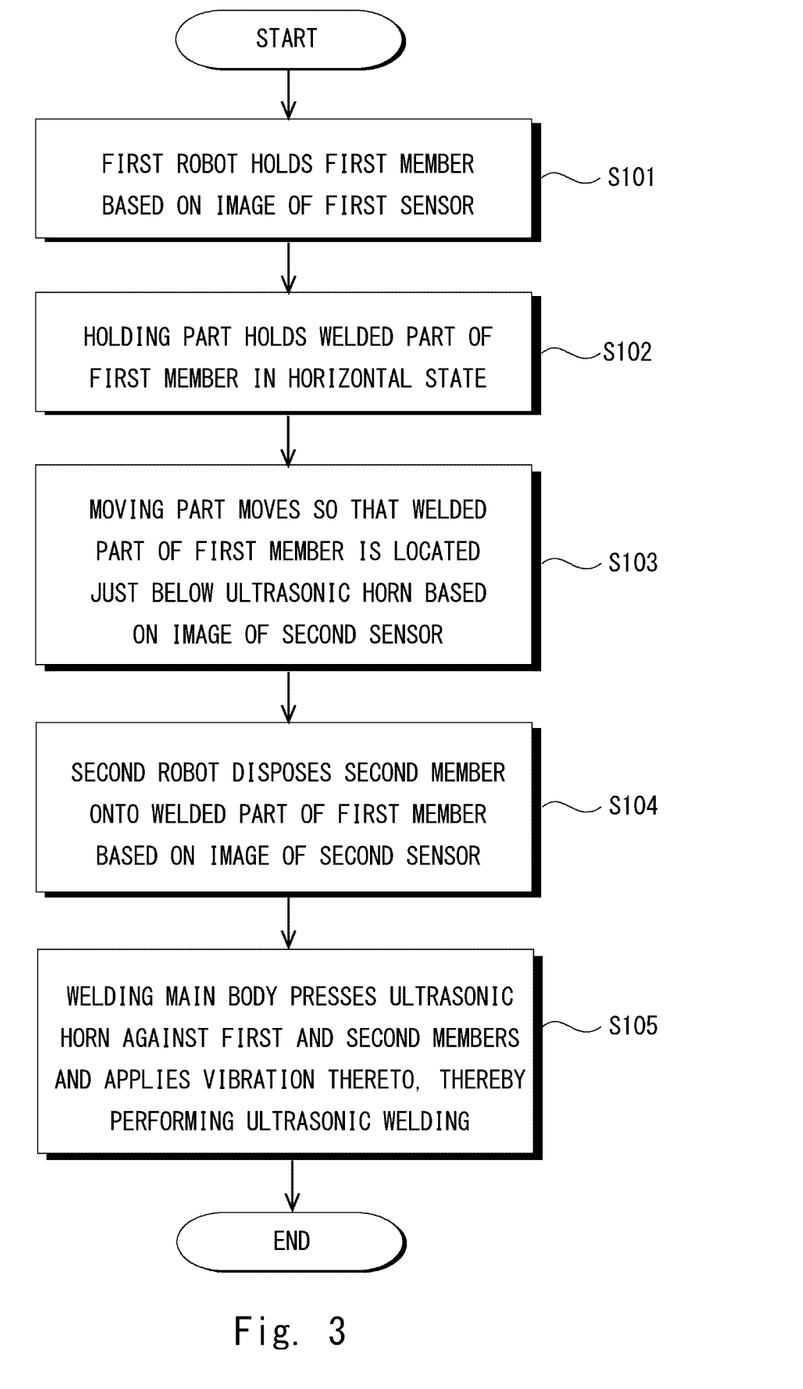
FIG. 3 is a flowchart showing a flow of an assembling method using the ultrasonic welding apparatus according to this embodiment.

Next, an assembling method using the ultrasonic welding apparatus 1 according to this embodiment will be described. FIG. 3 is a flowchart showing a flow of the assembling method using the ultrasonic welding apparatus according to this embodiment.

The holding part 31 of the first robot 3 holds the first member X based on the image of the first member X acquired by the first sensor 2 (Step S101).

The holding part 31 of the first robot 3 holds the welded part X1 of the first member X in a horizontal state (Step S102).

Based on the image of the first member X captured by the second sensor 6, the moving part 32 of the first robot 3 moves in such a way that the welded part X1 is located just below the ultrasonic horn 51 of the welding main body 5 (Step S103).

The moving part 32 may move in such a way that the welded part X1 of the first member X is positioned directly below the ultrasonic horn 51 of the welding main body 5 based on the image of the first member X captured by the second sensor 6 while the holding part 31 is holding the welded part X1 of the first member X in a horizontal state.

The second robot 4 disposes the second member onto the welded part X1 of the first member X based on the images of the first and second members captured by the second sensor 6 (Step S104).

The welding main body 5 presses the ultrasonic horn 51 against the first and second members X and Y provided on the welding table 52 in the vertical direction and applying vibration thereto, thereby performing ultrasonic welding to melt and adhere the members (Step S105).

Second Embodiment

In an assembling system 10 according to this embodiment, at least one of an assembling device for assembling, a bolting device for bolting, and an inspection device for inspecting the first and second members X and Y may be disposed as a device used in a process that comes after the welding. The assembling device may include a pressing device for pressing an element, an inserting device for inserting an element, a snap-in device for snapping an element, and the like.

When the work of each process is completed, the first robot 3 may carry the member on which work of each process is completed to the device used in the next process and dispose the member in the device. The device performs work on the disposed member. Thus, by combining the processes, holding the member by the first robot 3 in each process, and carrying the member by the first robot 3 between the processes, the whole assembling of the member can be automated.

Figure 4:
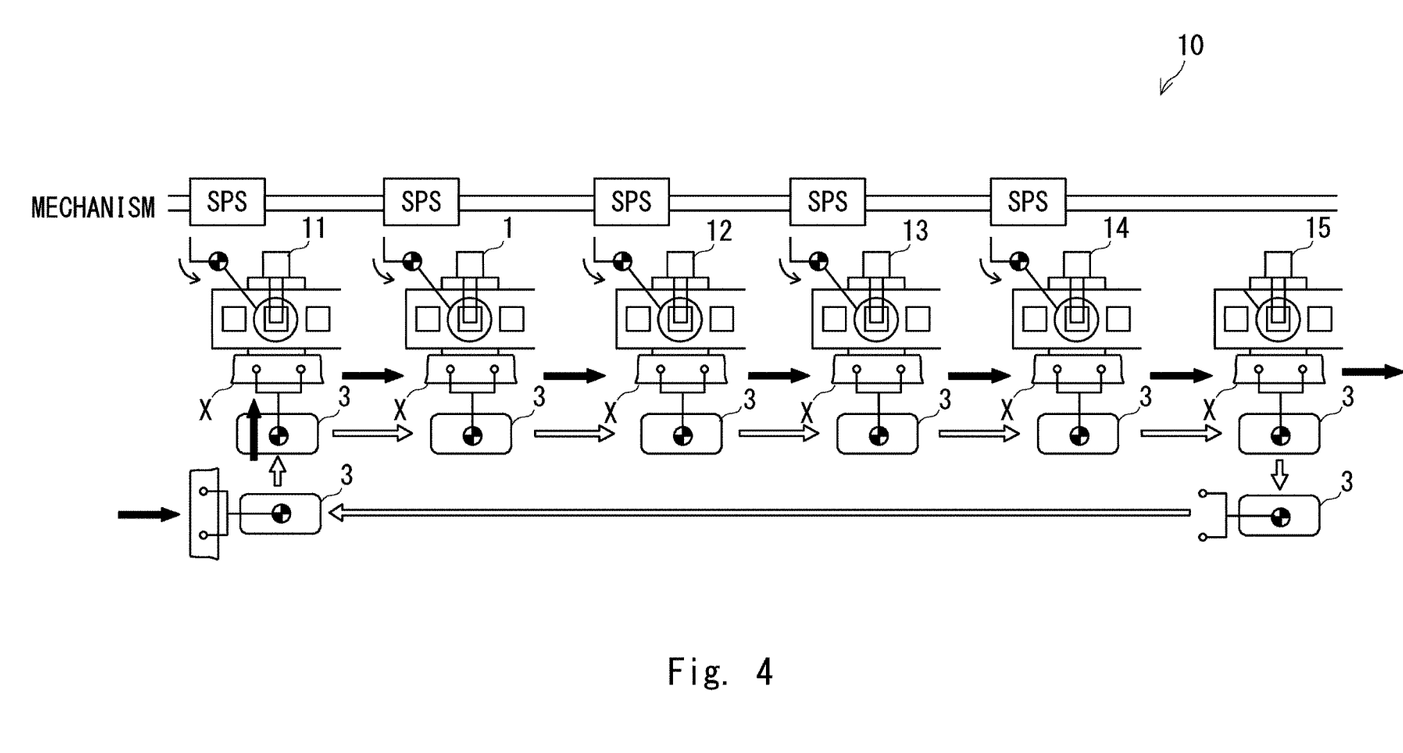
FIG. 4 is a diagram showing a schematic configuration of an assembling system according to this embodiment.

FIG. 4 is a diagram showing a schematic configuration of the assembling system according to this embodiment. For example, as shown in FIG. 4, a pressing device 11 is disposed as the first process. An ultrasonic welding apparatus 1 is disposed as the second process. A snap-in device 12 is disposed as the third process. A bolting device 13 is disposed as the fourth process. An assembling device 14 is disposed as the fifth process. An inspection device 15 is disposed as the sixth process.

For example, the first robot 3 holds a member and moves to the front of the pressing device 11 in the first process. As the first process, the pressing device 11 performs pressing work on the member held by the first robot 3. When the pressing work of the first process is finished, the first robot 3 holds the member on which the pressing work has been finished and moves to the front of the ultrasonic welding apparatus 1 of the second process. The ultrasonic welding apparatus 1 performs the welding work on the member held by the first robot 3 as the second process. When the welding work of the second process is finished, the first robot 3 holds the member on which the welding work has been finished and moves to the front of the snap-in device 12 of the third process.

The snap-in device 12 performs the snap-in work on the member held by the first robot 3 as the third process. When the snap-in work of the third process is finished, the first robot 3 holds the member on which the snap-in work has been finished and moves to the front of the bolting device 13 of the fourth process. The bolting device 13 performs bolting work on the member held by the first robot 3 as the fourth process. When the bolting work of the fourth process is finished, the first robot 3 holds the member on which the bolting work has been finished and moves to the front of the assembling device 14 of the fifth process.

As the fifth process, the assembling device 14 performs the assembling work on the member held by the first robot 3. When the assembling work of the fifth process is finished, the first robot 3 holds the member on which the assembling work has been finished and moves to the front of the inspection device 15 of the sixth process. The inspection device 15 performs the inspection work on the member held by the first robot 3 as the sixth process. When the inspection work of the sixth process is finished, the first robot 3 holds the member on which the inspection work has been finished and carries it out.

The robot holding each member may be fixed before the device used in each process. When the work of each process is finished, each robot may hand the member on which the work of each process has been finished to a robot of the next process. The robot in the next process holds the member handed to it and disposes it in the device in front of it, and this device then performs work on the disposed member.

Third Embodiment

Figure 5:
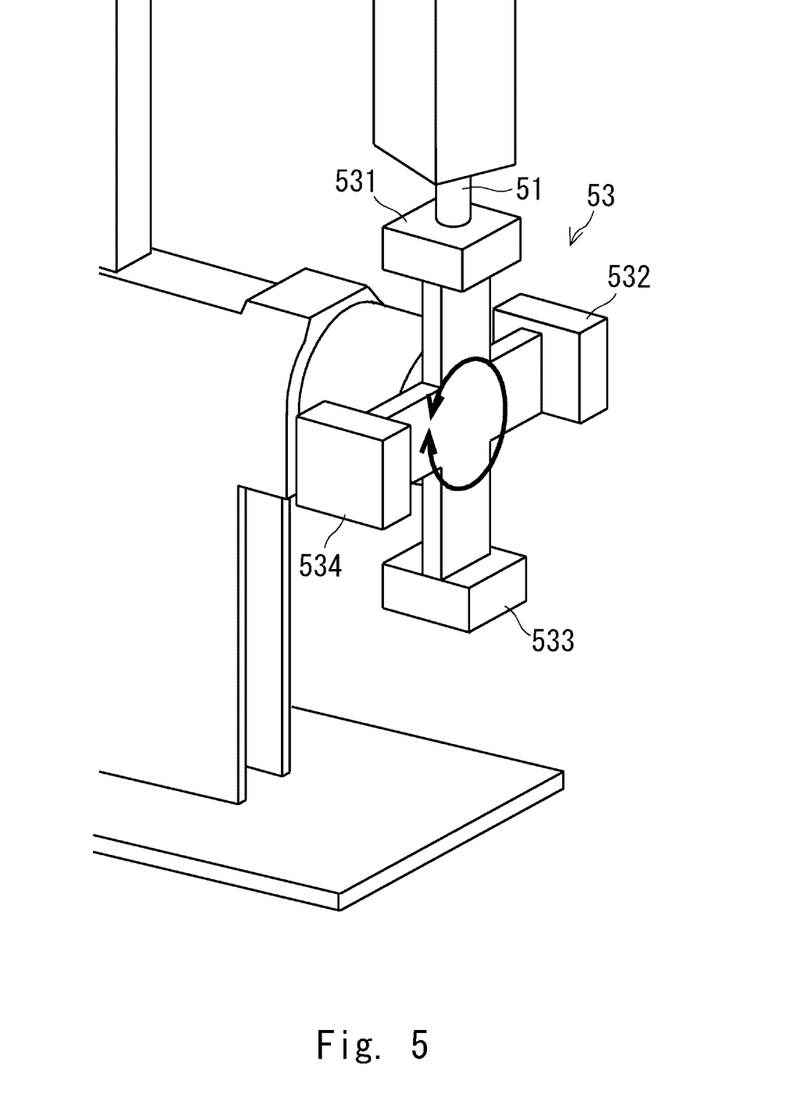
FIG. 5 is a diagram showing an example of a clamping jig according to this embodiment.

The welding main body 5 of the ultrasonic welding apparatus 1 presses, in a state in which the welding main body 5 is receiving the first and second members X and Y in a clamping jig, the ultrasonic horn 51 against the first and second members from above and vibrates the first and second members to perform welding. FIG. 5 is a diagram showing an example of the clamping jig according to this embodiment. As shown in FIG. 5, a clamping jig 53 according to this embodiment is configured in such a way that the shape of a receiving surface can be changed in accordance with the shape of a receiving member.

The clamping jig 53 includes, for example, a first reception part 531 formed in a first shape, a second reception part 532 formed in a second shape, a third reception part 533 formed in a third shape, and a fourth reception part 534 formed in a fourth shape. The first to fourth reception parts 531-534 each extend radially from the center and have receiving surfaces having the first to fourth shapes at the tips thereof.

For example, the first shape is formed into a plane, the second shape is formed into a small concave shape, the third shape is formed into a small convex shape, and the fourth shape is formed into a large convex shape. While the clamping jig 53 according to this embodiment includes four reception parts, the number of reception parts is not limited thereto. The number of the reception parts may be increased or decreased according to the type of the shape of the member to be manufactured.

The clamping jig 53 rotates the first to fourth reception parts 531-534 in such a way that the reception part corresponding to the shape of the member to be received among the first to fourth reception parts 531-534 is at the position of 0° (the top position). Accordingly, the shape of the reception part can be changed flexibly with respect to the shapes of the plurality of the members in one welding main body 5, and ultrasonic welding can be performed stably, thereby reducing the manufacturing cost.

Figure 6:
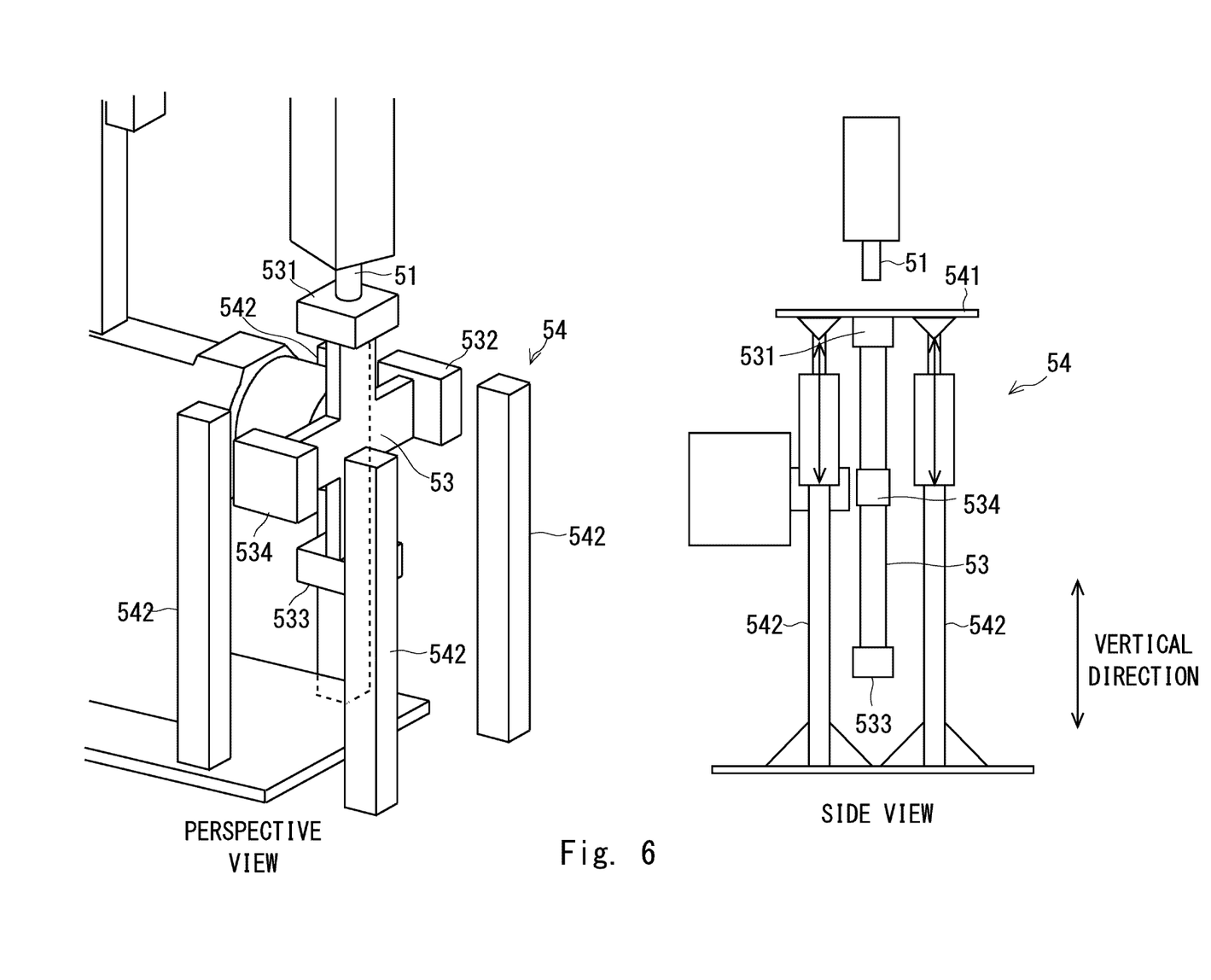
FIG. 6 is a diagram showing a variable holding mechanism according to this embodiment.

Furthermore, while receiving the member by the aforementioned clamping jig, the member may be held by a variable holding mechanism. FIG. 6 is a diagram showing the variable holding mechanism according to this embodiment. As shown in FIG. 6, a variable holding mechanism 54 includes a supporting board part 541 supporting a member and a plurality of extension/contraction parts 542 that are extended or contracted vertically to support the supporting board part 541. In the perspective view, the supporting board part 541 is omitted in such a way that the extension/contraction part 452 can be easily seen. The extension/contraction part 542 extends or contracts the extension/contraction mechanism by driving an actuator or the like. Accordingly, the member can be stably supported by extending or contracting the extension/contraction part 542 according to the shape of the member.

Although several embodiments of the present disclosure have been described, these embodiments are presented as examples only and are not intended to limit the scope of the disclosure. These new embodiments may be implemented in a variety of other forms and may be omitted, replaced, or modified in a variety of ways within the scope of the disclosure. These embodiments and variations thereof are included in the scope and gist of the disclosure and are included in the scope of the claimed disclosure and its equivalents.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An ultrasonic welding apparatus comprising:
a first robot including a holding part configured to hold a first member rotatably and tiltably and a moving part configured to move the robot itself; and
a welding main body in which a second member is disposed on the first member held by the holding part of the first robot and which perform welding by vibrating the first and second members by an ultrasonic horn, wherein
the holding part of the first robot holds a part to be welded of the first member in a horizontal state and the moving part moves in such a way that the part to be welded is located directly below the ultrasonic horn of the welding main body,
a second robot holds the second member and disposes the second member onto the part to be welded of the first member,
the welding main body presses the ultrasonic horn against the first and second members held by the first and second robots, respectively, thereby performing welding,
the welding main body presses, in a state in which the welding main body is receiving the first and second members in a clamping jig, the ultrasonic horn against the first and second members from above and vibrates the first and second members to perform welding, and
the clamping jig is configured to change a shape of a receiving surface in accordance with the shape of the receiving first and second members.

2. The ultrasonic welding apparatus according to claim 1, wherein
at least one of an assembling device for assembling, a bolting device for bolting, and an inspection device for inspecting the first and second members is disposed as a device used in a process that comes after the welding, and
when work in each process is completed, the first robot carries a member on which work in each process has been completed to a device used in a next process and disposes the member in the device, and this device performs work on the disposed member.

3. The ultrasonic welding apparatus according to claim 1, wherein
the clamping jig includes a plurality of reception parts each extending radially from a center portion of the clamping jig, and
the clamping jig rotates the plurality of reception parts such that one of the plurality of reception parts is arranged a top position that includes the receiving surface that corresponds with the shape of the receiving first and second members.

* * * * *